United States Patent [19]
Nitz et al.

[11] Patent Number: 5,129,286
[45] Date of Patent: Jul. 14, 1992

[54] ENGINE TORQUE MANAGEMENT FOR ENGINE SPEED FLARE SUPPRESSION FOR CLUTCH-TO-CLUTCH-UPSHIFTING

[75] Inventors: Larry T. Nitz, Troy; Rimas S. Milunas, Royal Oak, both of Mich.

[73] Assignee: Saturn Corporation, Troy, Mich.

[21] Appl. No.: 722,021

[22] Filed: Jun. 27, 1991

[51] Int. Cl.⁵ .............................................. F16H 59/14
[52] U.S. Cl. ........................................ 74/858; 74/851
[58] Field of Search ............... 364/424.1; 74/858, 851, 74/866, 860

[56] References Cited

U.S. PATENT DOCUMENTS

| | | | |
|---|---|---|---|
| 4,653,350 | 3/1987 | Downs et al. | 74/866 X |
| 4,691,285 | 9/1987 | Takeda | 74/866 X |
| 4,724,723 | 2/1988 | Lockhart et al. | 74/851 X |
| 4,809,660 | 3/1989 | Marsh et al. | 123/417 |
| 5,038,287 | 8/1991 | Taniguchi et al. | 74/858 X |
| 5,070,747 | 12/1991 | Lentz et al. | 74/866 |
| 5,079,970 | 1/1992 | Butts et al. | 74/851 X |

Primary Examiner—Richard Lorence
Assistant Examiner—Khoi Q. Ta
Attorney, Agent, or Firm—Mark A. Navarre

[57] ABSTRACT

An improved powertrain control which recognizes the occurrence of engine speed flare during low torque upshifting, and effectively converts the shift to a power-off upshift via an override of the normal engine torque management controls. The engine spark timing is retarded by a predetermined amount during every power-on upshift for the reasons described above. However, when the occurrence of engine flare is detected, the control increases the spark retard to a maximum valve, substantially eliminating the transmission input torque. As the on-coming element smoothly applies and decelerates the input, the flare condition terminates, and the spark timing is returned to the predetermined amount for completion of the shift.

5 Claims, 7 Drawing Sheets

ENGINE TORQUE MANAGEMENT FOR ENGINE SPEED FLARE SUPPRESSION FOR CLUTCH-TO-CLUTCH-UPSHIFTING

This invention relates to the utilization of engine torque controls during the shifting of an automatic transmission, and more particularly, to a torque control specific to low torque power-on upshifting of the transmission.

BACKGROUND OF THE INVENTION

A current trend in the control of automotive powertrains including automatic shift transmissions is to coordinate the engine and transmission controls for improved durability and shift quality. The engine controls typically include spark timing retardation, fuel reduction, throttle control, or some combination thereof. See, for example, the U.S. Pat. No. 4,724,723 to Lockhart et al., issued Feb. 16, 1988, and Marsh et al. U.S. Pat. No. 4,809,660, issued Mar. 7, 1989, both of which are assigned to General Motors Corporation. In relation to shift quality, the engine torque reduction controls are primarily applied during power-on upshifting to reduce or shorten the output torque disturbance associated with engine inertia.

In the transmission, the process of shifting involves an exchange of on-coming and off-going fluid operated friction elements, generally characterized as comprising three successive phases: a fill phase, a torque phase and an inertia phase. In the fill phase, the on-coming element is prepared for torque transmission; in the torque phase, the torque exchange occurs without a corresponding speed change; and in the inertia phase, the speed change occurs. In shift controls based on an open-loop control philosophy, the fluid pressure supplied to the on-coming element during the torque and inertia phases is progressively increased in accordance with a predetermined pressure schedule, based in part on an estimate of the engine torque applied to the transmission at the initiation of the shift. The scheduled pressure determines the torque capacity of the on-coming element, and therefore, the progression of the shift.

A difficulty arises with the above-described transmission controls during low torque conditions when accessory loading represents a sizable percentage of the torque developed by the engine. Since the transmission input torque cannot be accurately estimated under such conditions, the scheduled pressure may be inappropriate. This is particularly significant if the input torque is underestimated, since the scheduled pressure will be too low, allowing the engine speed to flare.

SUMMARY OF THE PRESENT INVENTION

The present invention is directed to an improved powertrain control which recognizes the occurrence of engine speed flare during low torque upshifting, and effectively converts the shift to a power-off upshift via an override of the normal engine torque management controls. In the preferred embodiment, the engine spark timing is retarded by a predetermined amount during every power-on upshift for the reasons described above. However, when the occurrence of engine flare is detected, the control of this invention increases the spark retard to a maximum value, substantially eliminating the transmission input torque. As the on-coming element smoothly applies and decelerates the input, the flare condition terminates, and the spark timing is returned to the predetermined amount for completion of the shift.

DETAILED DESCRIPTION OF THE DRAWINGS

Figure 1A:
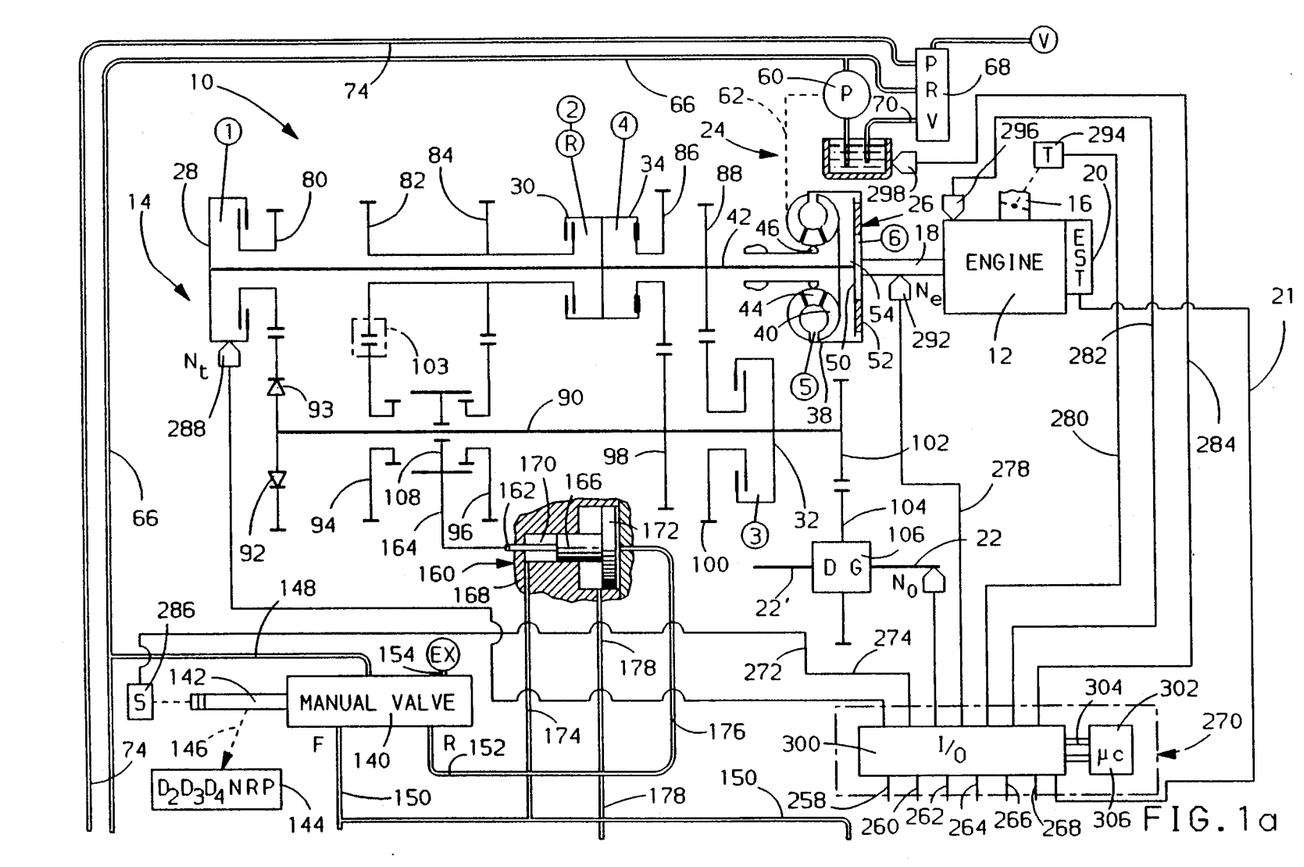
FIGS. 1a–1b schematically depict a computer-based electronic transmission control system controlled according to this invention.
Figure 1B:
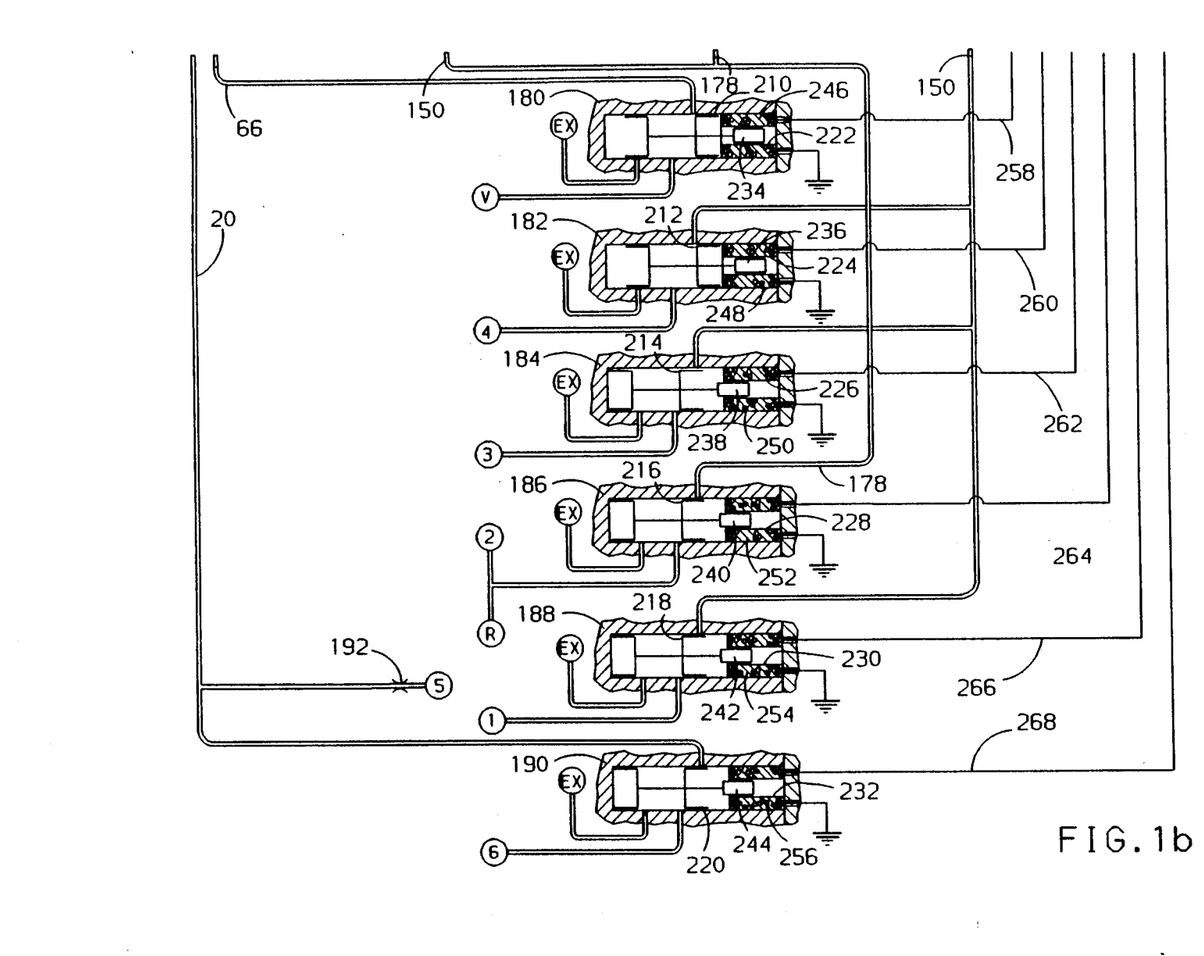

Referring particularly to FIGS. 1a and 1b, the reference numeral 10 generally designates a motor vehicle drivetrain including a spark ignition internal combustion engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18.

The engine ignition function is carried out with a conventional spark ignition system (not shown) which cooperates with a conventional electronic spark timing (EST) unit 20 to initiate combustion in the various engine cylinders in accordance with a predetermined schedule. The EST unit 20 typically schedules the spark timing as a predetermined function of engine speed and load, and modifies the scheduled timing value in accordance with spark retard commands, if any, present on line 21. As described below, the control of the present invention develops a spark retard command on line 21 to eliminate engine flare during low torque upshifting of transmission 14.

The transmission 14 transmits engine output torque to a pair of drive axles 22, 22' through a torque converter 24 and one or more of the fluid operated clutching devices 26–34, such clutching devices being applied or released according to a predetermined schedule for establishing the desired transmission speed ratio. The impeller or input member 6 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545 issued Aug. 3, 1982 to Schuster, and a representative pressure regulator valve is disclosed in the U.S. Pat. No. 4,283,970 to Vukovich, issued Aug. 18, 1981, such patents being assigned to General Motors Corporation.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown).

Engagement of the clutching device is effected by supplying fluid pressure to an apply chamber thereof. The resulting torque capacity of the clutching device is a function of the applied pressure less the return spring pressure, hereinafter referred to as the working pressure pressure. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized by the ratio of the turbine speed Nt to output speed No. Representative Nt/No ratios for transmission 14 are as follows:

First—2.368
Second—1.273
Third—0.808
Fourth—0.585
Reverse—1.880

Shifting from a current forward speed ratio to a desired forward speed ratio requires that the clutching device associated with the current speed ratio (off-going) be disengaged, and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission include a manual valve 140, a directional servo 160 and a plurality of electrically operated fluid valves 0-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 52. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 186 and 188 receive fluid pressure from the forward output line 150 of manual valve 140, and are controlled to direct variable amounts of such pressure to the clutching devices 34, 32 and 28, as indicated by the circled numerals 4, 3 and 1, respectively.

The fluid valve 186 receives fluid pressure from the forward output line 150 and the directional servo output line 178, and is controlled to direct a variable amount of such pressure to the clutching device 30, as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26, as indicated by the circled numeral 6. The apply chamber 54 of the clutching device 26 is supplied with fluid pressure from the output line 74 via the orifice 192, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1.

In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

While the fluid valves 180-190 have been illustrated as spool valves, other types of valves could be substituted therefor. By way of example, valves of the ball and seat type could be used. In general terms, the fluid valves 180-190 may be mechanized with any three-port pulse-width-modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed No; and the speed transducer 292 senses the velocity of the engine output shaft 18 and therefore the engine speed Ne.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-285 according to a predetermined control algorithm as set forth herein, for developing a suitable spark retard signal on line 21, and for energizing the fluid valve solenoid coils 246-256 via output lines 258-268. As such, the control unit 270 includes an input/output (I/O) device 300 for receiving the input signals and transmitting the various output signals, and a microcomputer 302 which communicates with the I/O device 300 via an address-and-control bus 304 and a bi-directional data bus 306. Flow diagrams representing suitable program instructions for carrying out the control of this invention are depicted in FIGS. 4-7.

As indicated above, every shift from one speed ratio to another involves disengagement of an off-going clutching device and engagement of an on-coming clutching device. Each shift includes a fill phase during which the apply chamber of the on-coming clutch is filled with fluid, a torque phase during which the engine torque is transferred from the off-going clutch to the on-coming clutch, and an inertia phase during which the speed change occurs.

According to this invention, the fluid pressure supplied to the on-coming clutch during the torque and inertia phases is scheduled in relation to an estimation of the gear set input torque Tv. The input torque Tv may be calculated as a function of the engine manifold absolute pressure (MAP), the engine pumping efficiency (K), a mechanical friction term (Tf), the accessory load torque (TL), and the torque multiplication ratio (Tc) of the torque converter 24 according to the following expression:

$$Tv = [(MAP \times K) - Tf - TL] \times Tc$$

The engine MAP is determined from the sensor 296, while the efficiency K is stored based on previously determined data. The mechanical friction term Tf is determined as a function of engine speed, and the load torque term TL is estimated by loading indicators. The torque multiplication ratio Tc is determined as a function of the speed ratio Nt/Ne.

Figure 2:
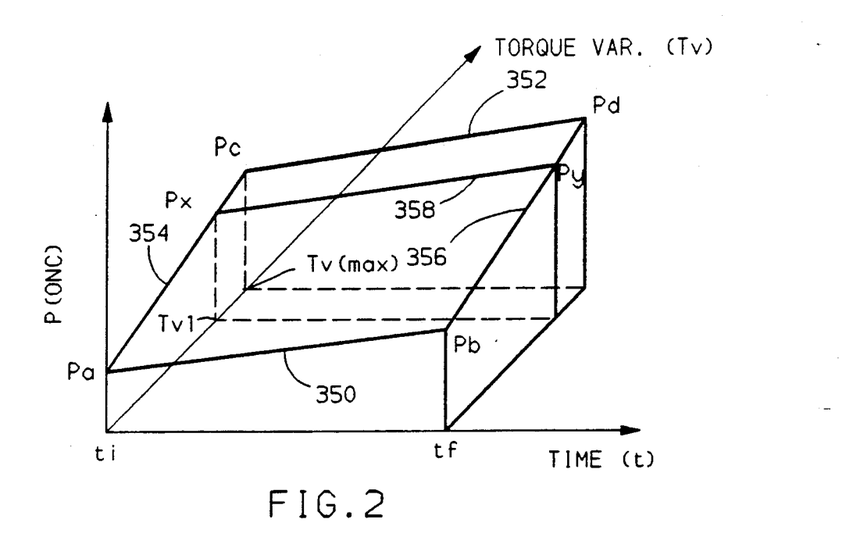
FIGS. 2–3 graphically depict various transmission and control parameters occurring in the course of a low torque upshift.

In practice, the desired pressure for the on-coming clutch is stored as a function of the torque variable Tv and time, as graphically depicted in FIG. 2. For any given value of torque variable Tv, the pressure vs. time schedule is defined by a pair of pressure endpoints, one such endpoint corresponding to an initial time ti, and the other corresponding to a final time tf. The time ti marks the beginning of the torque phase, and the time tf marks the end of the inertia phase. If the calculated torque variable Tv is zero or near-zero, for example, the pressure vs. time schedule is defined by the line 350 connecting the pressure endpoints Pa and Pb. If the calculated torque variable Tv is very high, as designated by Tv(max), the pressure vs. time schedule is defined by the line 352 connecting the pressure endpoints Pc and Pd. In practice, only the four pressure endpoints Pa, Pb, Pc, and Pd need be stored by the control unit 270. For any calculated torque variable value Tvl between zero and Tv(max), the initial pressure Px is linearly interpolated along the line 354 connecting the initial pressure endpoints Pa and Pc, and the final pressure Py is linearly interpolated along the line 356 connecting the final pressure endpoints Pb and Pd. In such case, the pressure vs. time schedule for the shift would be defined by the line 358 connecting the initial and final pressures Px and Py. The time (tf - ti) for a given shift is empirically derived and stored in the memory of control unit 270.

When the torque variable is properly determined, the scheduled pressure will produce on-coming torque capacity which substantially matches the input torque so that the off-going element may be quickly released. This minimizes the torque phase of the shift and the consequent output torque disturbance. However, at low input torque levels, the engine accessory loading may consume a relatively high percentage of the engine output torque. A particularly unsatisfactory situation can occur when the input torque is underestimated due to lower than expected accessory loading. In this case, the on-coming pressure may be scheduled for zero or slightly negative input torque, when in fact, the input torque is positive. In this situation, the on-coming torque capacity is insufficient to transmit the input torque, and the engine flares until the on-coming clutch develops sufficient torque capacity.

The control of this invention avoids the above-described situation by recognizing the occurrence of engine speed flare during low torque upshifting, and effectively removing the engine torque through the use of spark timing controls. In the illustrated embodiment, spark timing retardation is normally employed for durability and shift quality concerns, and the control of this invention overrides the normal retardation to virtually eliminate the engine output torque so long as the engine flare is detected. When engine flare is no longer observed, the normal spark timing controls are resumed.

Figure 3:
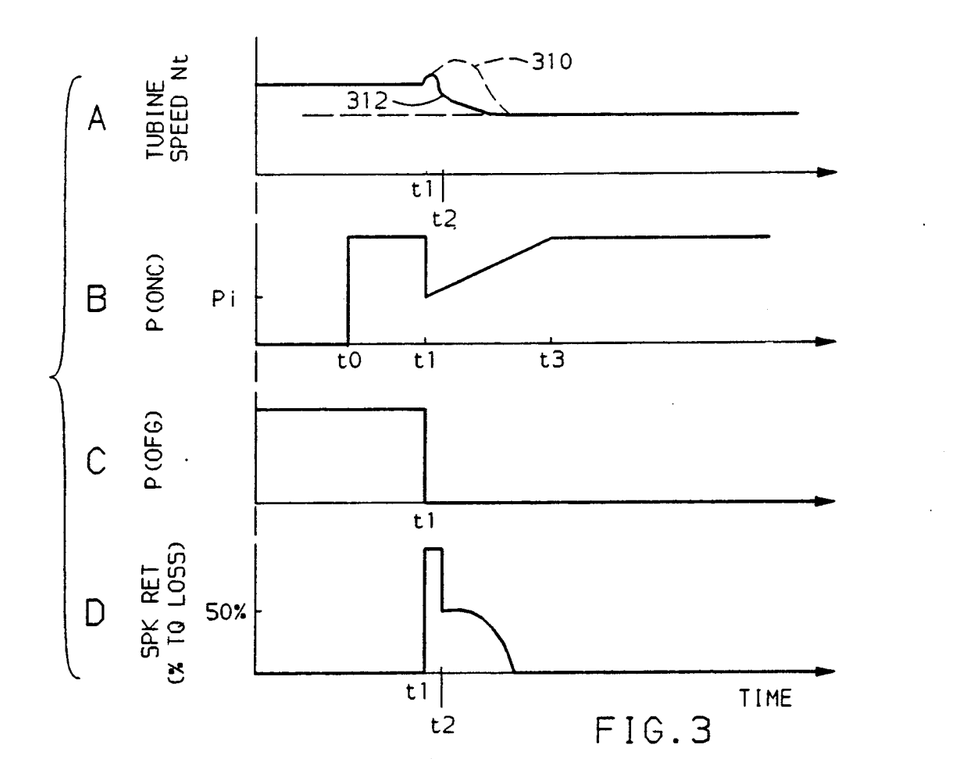

The operation of this invention is graphically depicted by Graphs A-D of FIG. 3 for a low torque upshift in which the on-coming clutch as underpressured due to an underestimation of the torque variable Tv. Graph A depicts the turbine speed Nt; Graph B depicts the on-coming clutch pressure command P(ONC); Graph C depicts the off-going clutch pressure command P(OFG); and Graph D depicts the spark retard signal SPK RET applied to line 21 by control unit 270. The shift is initiated at time t0 by supplying fluid to the on-coming clutch substantially at line pressure. At the end of the fill period, time t1, the on-coming pressure command P(ONC) is reduced to an initial pressure Pi determined as a function of the computed torque variable Tv. At the same time, the apply pressure of the off-going clutch is released (Graph B), and the spark retard signal is set to a value for achieving a predetermined amount of engine torque loss for engine torque management. Normally, the engine torque loss is initialized at approximately 50%, and then tapers off in relation to the progression of the shift. The scheduled on-coming pressures are calibrated based on the normally applied spark retard, and absent a misjudgment of the input torque, will produce on-coming torque capacity which substantially matches the input torque for achieving a high quality upshift.

Due to the input torque underestimation, however, the torque capacity of the on-coming clutch is insufficient to hold the input torque, and the engine speed begins to flare, as indicated in Graph A. If unchecked, the engine flare would continue to increase, as indicted by the broken line 310, until the on-coming clutch capacity would overcome the input torque. However, upon recognizing the incipient engine flare condition, the control of this invention operates as shown in Graph D to override the normal engine spark timing controls to effect an immediate engine torque loss of approximately 100%. This has a nearly immediate effect on the turbine speed, as indicated by the trace 312 in Graph A, quickly terminating the flare condition. When the flare condition is terminated at time t2, the spark retard setting is returned to the normal value as seen in Graph D, and the shift progresses normally to its conclusion at time t3.

Figure 4:
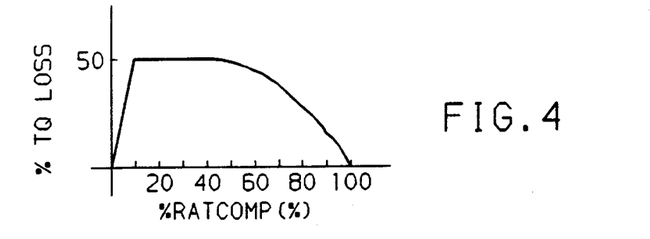
FIG. 4 graphically depicts the spark retard schedule employed during upshifting.

For the purpose of completeness, FIG. 4 depicts the normally applied spark retard in percent torque loss. A separate table may be employed to convert percent torque loss to a spark retard timing value. As indicated above and in FIG. 4, the normal spark retard is scheduled as a function of a shift progression term, %RATCOMP. The term %RATCOMP refers to the percentage of ratio completion, as judged by the ratio Nt/No relative to the initial and target ratio values.

Figure 5:
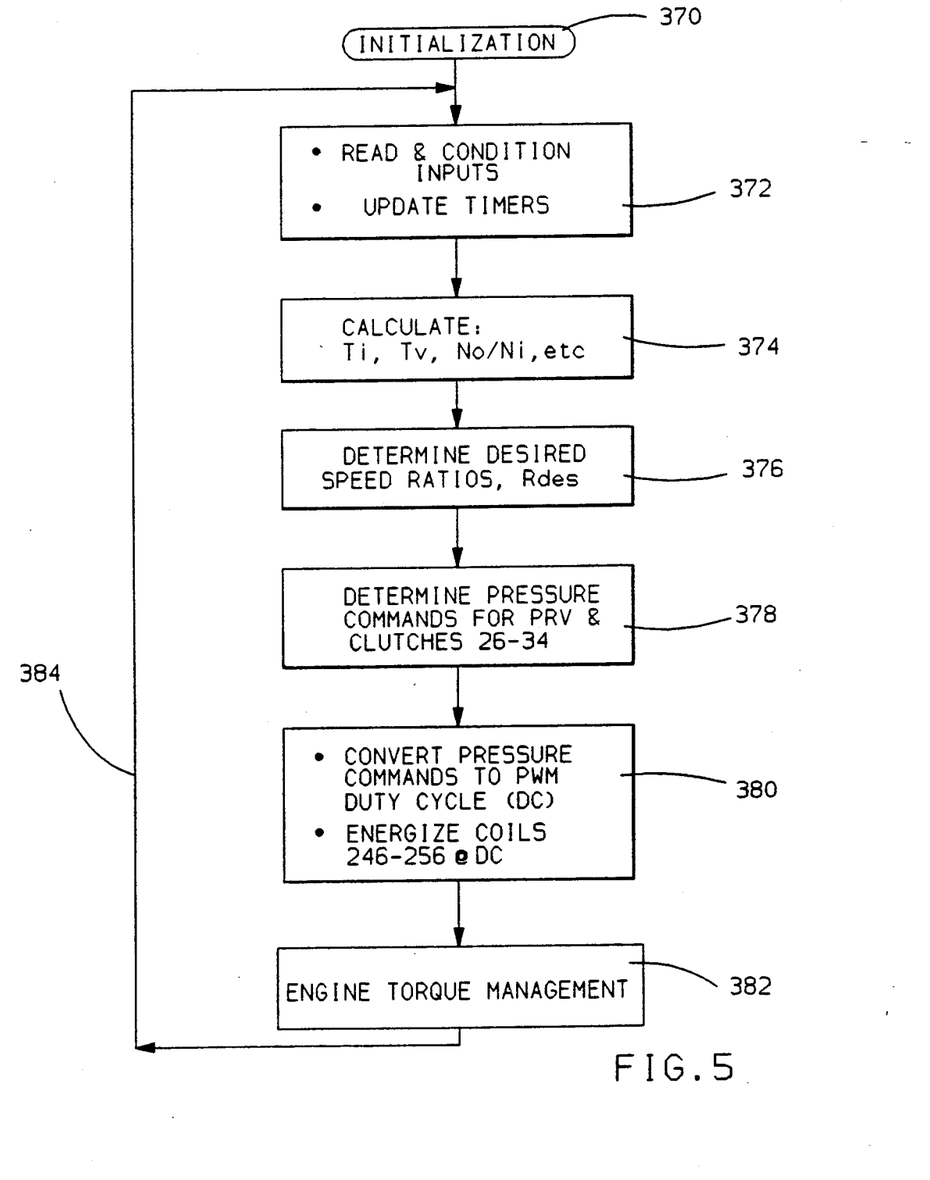
FIGS. 5–8 depict flow diagrams executed by the computer-based controller of FIG. 1a in carrying out the control of this invention.
Figure 6:
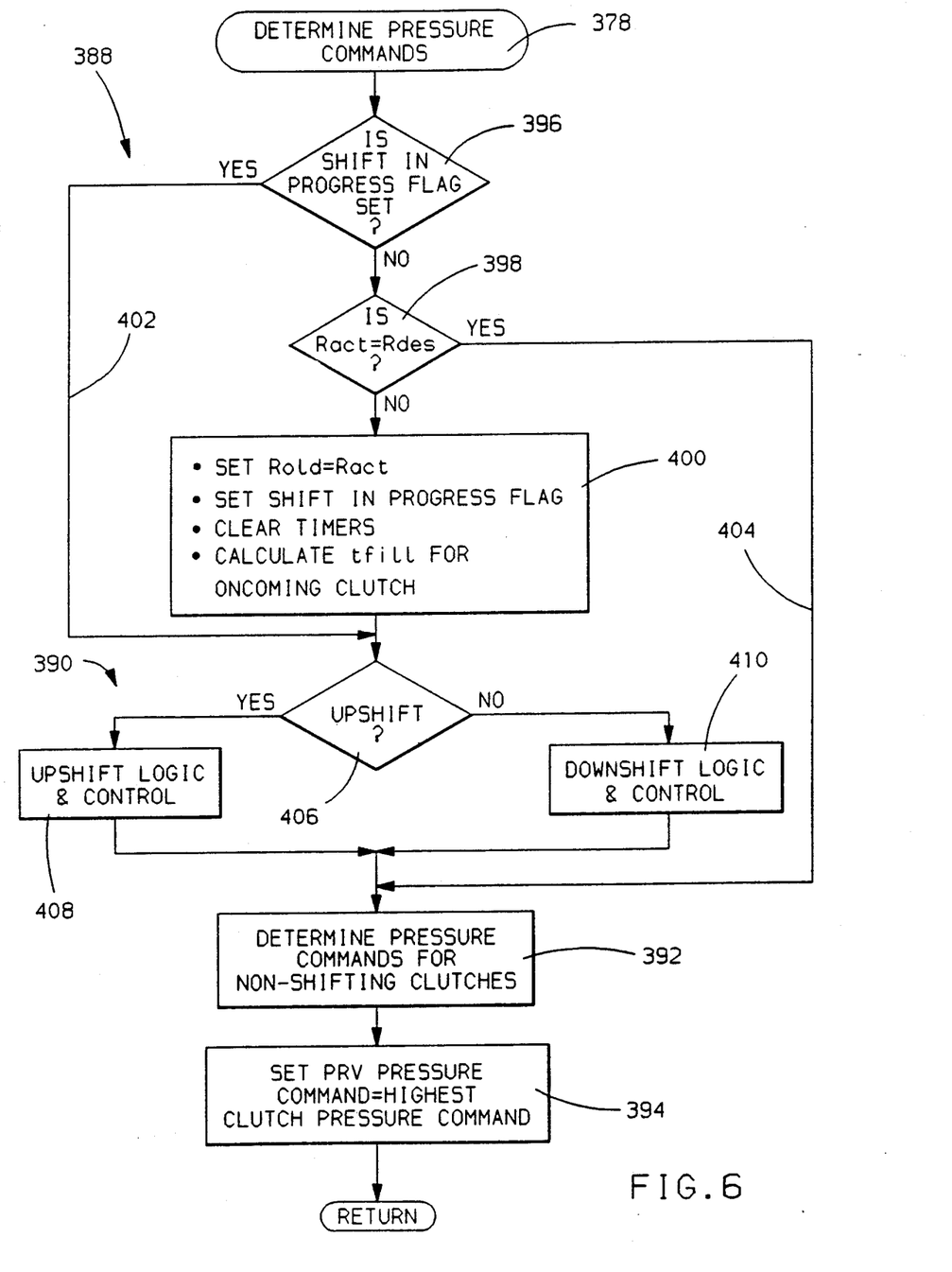
Figure 7:
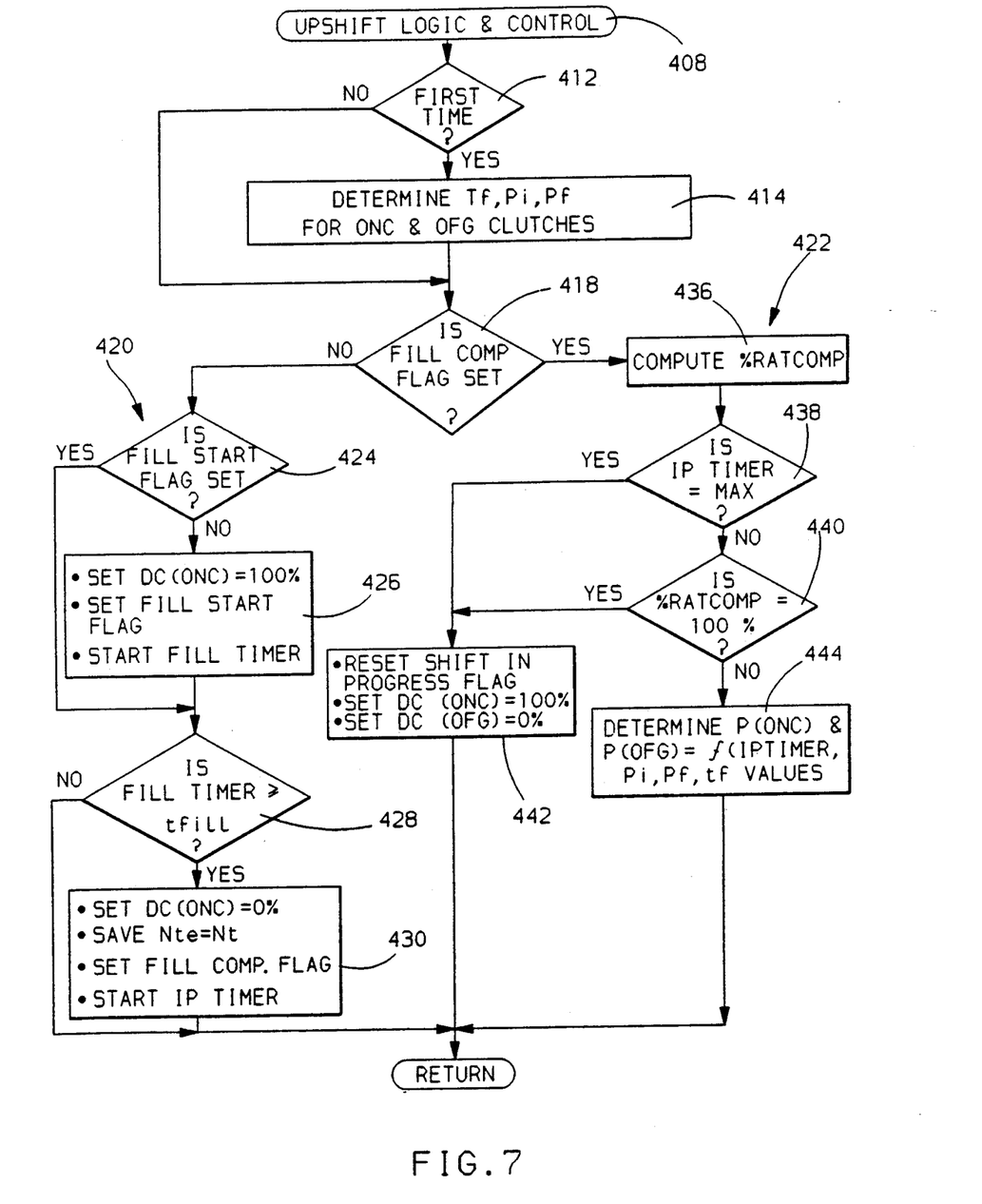
Figure 8:
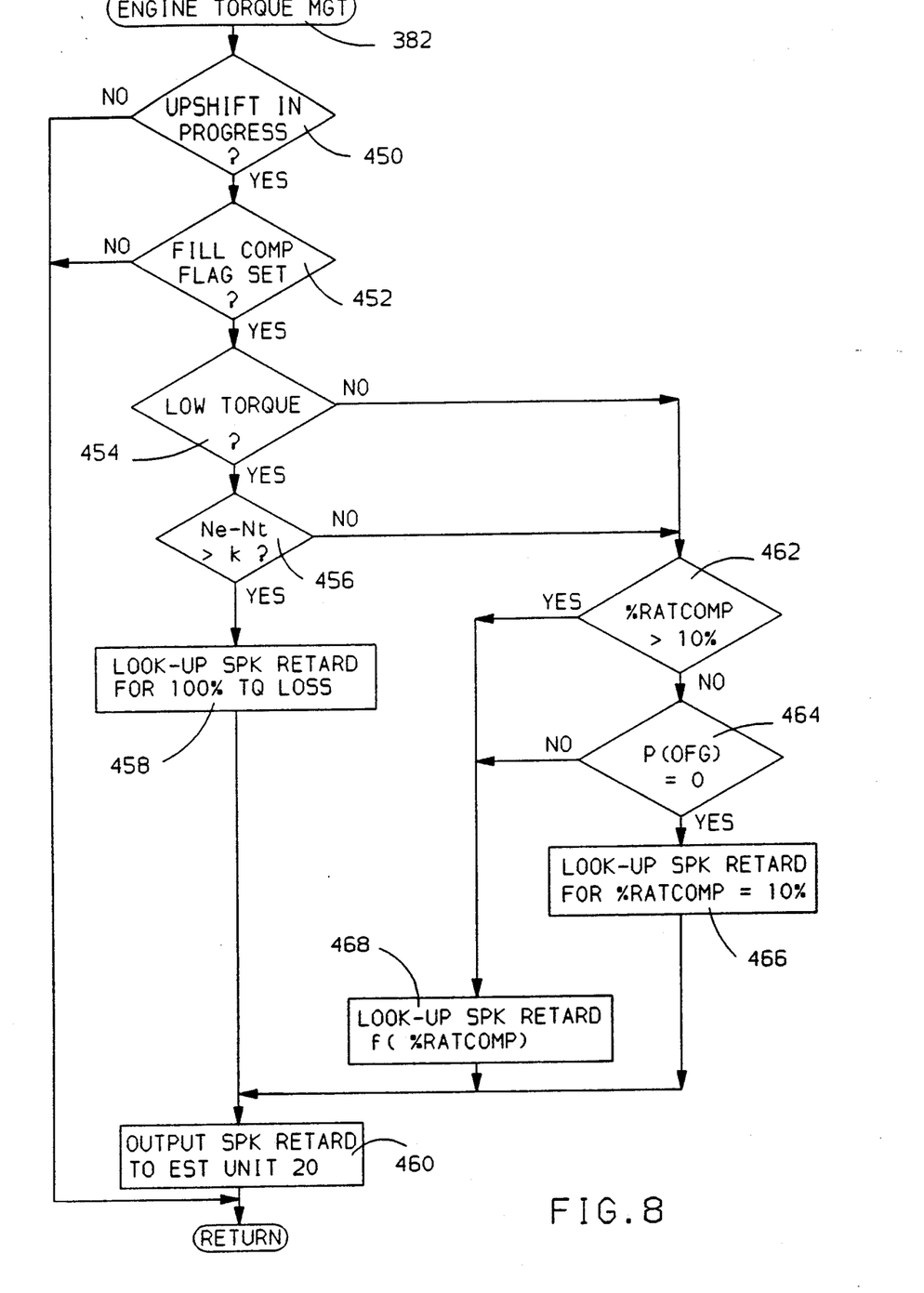

The flow diagrams depicted in FIGS. 5-8 represent program instructions to be executed by the microcomputer 302 of control unit 270 in mechanizing ratio shifting and the control of this invention. The flow diagram of FIG. 5 represents a main or executive program which calls various subroutines for executing particular control functions as necessary. The flow diagrams of FIGS. 6-8 represent the functions performed by those subroutines which are pertinent to the present invention.

Referring now more particularly to FIG. 5, the reference numeral 370 designates a set of program instructions executed at the initiation of each period of vehicle operation for initializing the various tables, timers, etc., used in carrying out the control functions of this invention. Following such initialization, the instruction blocks 372-382 are repeatedly executed in sequence, as designated by the flow diagram lines connecting such instruction blocks and the return line 384. Instruction block 372 reads and conditions the various input signals applied to I/O device 300 via the lines 272-285, and updates (increments) the various control unit timers. Instruction block 374 calculates various terms used in the control algorithms, including the input torque Ti, the torque variable Tv, and the speed ratio No/Ni. Instruction block 376 determines the desired speed ratio, Rdes, in accordance with a number of inputs including throttle position, vehicle speed, and manual valve position.

In transmission control, this function is generally referred to as shift pattern generation. Instruction block 378 determines the clutching device pressure commands for effecting a ratio shift, if required. The pressure commands for the pressure regulator valve PRV and nonshifting clutching devices are also determined. An expanded description of the instruction block 378 is set forth below in reference to the flow diagrams of FIGS. 6-7. Instruction block 380 converts the clutching device and PRV pressure commands to a PWM duty cycle based on the operating characteristics of the various actuators (empirically determined), and energizes the actuator coils accordingly. Instruction block 382 develops a spark retard signal on line 21 for EST unit 20 for engine torque management and flare control during shifting. An expanded description of the instruction block 382 is set forth below in reference to the flow diagram of FIG. 8.

As indicated above, the flow diagrams of FIGS. 6 and 7 set forth the clutch and PRV pressure determination algorithm generally referred to at the main loop instruction block 378 of FIG. 5. On entering such algorithm, the blocks designated generally by the reference numeral 388 are executed to set up initial conditions if a shift is desired. If a shift is desired, the blocks designated generally by the reference numeral 390 are executed to develop pressure commands for the clutching devices involved in the shift. Thereafter, the instruction blocks 392 and 394 are executed to develop pressure commands for the nonshifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio Ract (that is, No/Nt) is equal to the desired speed ratio Rdes determined at instruction block 376 of FIG. 5; and the instruction block 400 for setting up the initial conditions for a ratio shift. The instruction block 400 is only executed when decision blocks 396 and 398 are both answered in the negative. In such case, instruction block 400 serves to set the old ratio variable, Rold, equal to Ract, to set the "SHIFT IN PROGRESS" flag, clear the shift timers, and to calculate the fill time tfill for the on-coming clutching device. If a shift is in progress, the execution of blocks 398 and 400 is skipped, as indicated by the flow diagram line 402. If no shift is in progress, and the actual ratio equals the desired ratio, the execution of instruction block 400 and the blocks designated by the reference numeral 390 is skipped, as indicated by the flow diagram line 404.

The blocks designated by the reference numeral 390 include the decision block 406 for determining if the shift is an upshift or a downshift; the instruction block 408 for developing pressure commands for the active (shifting) clutching devices if the shift is an upshift; and the instruction block 410 for developing the pressure commands for the active clutching devices if the shift is a downshift. To illustrate how such pressure commands are developed, the steps involved in the development of a typical power-on upshift (i.e., instruction block 408) are set forth in the flow diagram of FIG. 7.

On entering the flow diagram of FIG. 7, the control unit executes a shift initializing routine comprising the blocks 412-414. In the first execution of the routine in a given shift, determined by the decision block 412, the instruction block 414 is executed to determine the pressure parameters Pi, Pf and tf for the on-coming (ONC) and off-going (OFG) clutching devices. In subsequent executions of the routine, decision block 412 is answered in the negative.

Decision block 418 is then executed to determine if the fill phase of the shift is completed, as indicated by the "FILL COMP" flag. If not, the flow diagram branch, generally designated by the reference numeral 420, is executed; if so, the flow diagram branch, generally designated by the reference numeral 422, is executed.

The flow diagram branch 420 includes a fill initializing routine comprising the blocks 424 and 426 and a fill completion routine comprising the blocks 428 and 430. At the beginning of each shift, the "FILL COMP" flag is not set, and the decision block 424 of the fill initializing routine is executed to determine if the fill phase has started, as indicated by the "FILL START" flag. Initially, the "FILL START" flag is not set, and instruction block 426 is executed to set the energization duty cycle of the on-coming clutching device, DC(ONC), equal to 100%, to set the "FILL START" flag, and to start a FILL TIMER. Thereafter, decision block 424 is answered in the affirmative, and execution of instruction block 426 is skipped. Decision block 428 of the fill completion routine determines if the count in FILL TIMER is greater than or equal to the fill time tfill determined at instruction block 400 of FIG. 11. If so, instruction block 430 is executed to save the entry turbine speed Nte, to set the "FILL COMP" flag, and to start the inertia phase timer, IP TIMER. If decision block 428 is answered in the negative, the fill phase is incomplete and execution of the instruction block 430 is skipped.

After the fill period has elapsed and decision block 418 is answered in the affirmative, the flow diagram branch 422 is executed to complete the shift. First, the instruction block 436 is executed to calculate the value of the term %RATCOMP for use in the engine torque management routine of FIG. 8 and for pressure scheduling upon completion of the shift. The decision blocks 438 and 440 are then executed to determine if the count in IP TIMER is at a maximum value MAX, or if the term %RAT is substantially equal to 100%. If either of the decision blocks 438 or 440 are answered in the affirmative, the shift is complete and instruction block 442 is executed to reset the "SHIFT IN PROGRESS" flag, to set the on-coming duty cycle, DC(ONC), equal to 100%, and to set the off-going duty cycle, DC(OFG), equal to 0%. If both decision blocks 438 and 440 are answered in the negative, the instruction block 444 is executed to determine the base on-coming and off-going pressure commands, P(ONC) and P(OFG) as a function of the Pi, Pf, tf, and IP TIMER values determined at instruction block 414.

Referring to the Engine Torque Management routine of FIG. 8, the decision blocks 450-456 define entry conditions to the flare elimination spark retard control. If an upshift is in progress (decision block 450), the fill phase of the upshift is complete (decision block 452), the torque variable being used to schedule the on-coming pressure command P(ONC) is less than a low threshold value (decision block 454), and the engine speed Ne is flaring (decision block 456), the instruction blocks 458 and 460 are executed to look-up and output on line 21a a spark retard value for producing a 100% engine torque loss. The spark retard look-up may be effected with an empirically determined table of spark retard vs. % engine torque loss, substantially as set forth in the U.S. Pat. No. 4,809,660, to Marsh et al., issued Mar. 7, 1989 and assigned to General Motors Corporation. Thus, the spark retard is maintained so long as the entry conditions are met.

If an upshift is in progress and the fill phase is complete, but the torque variable is greater than the reference, a normal spark retard control represented by the flow diagram blocks 460-468 is executed in place of the above-described blocks 456-458. When the ratio completion term %RATCOMP is less than 10% (decision block 462) and the off-going pressure P(OFG) is fully released (decision block 464), the block 466 is executed to initialize the spark retard at 50% engine torque loss. This is achieved by using a look-up table based on FIG. 4, described above. When the ratio completion term %RATCOMP exceeds 10% (decision block 462) the block 468 is executed to determine the spark retard as a function of the ratio completion term %RATCOMP per FIG. 4. Of course, the normal spark retard routine is unnecessary to the flare control method of the present invention, and is only described to illustrate the preferred embodiment.

While this invention has been described in reference to the illustrated embodiment, it is expected that various modifications will occur to those skilled in the art, and it should be understood that control methods incorporating such modifications may fall within the scope of this invention, which is defined by the appended claims.

The embodiments of the invention in which an exclusive property or privilege is claimed are defined as follows:

1. In a motor vehicle having an engine connected to supply torque to a multiple speed ratio transmission, the transmission being upshifted from a first speed ratio to a second speed ratio by releasing an off-going fluid pressure supplied to a first friction element associated with said first speed ratio and supplying on-coming fluid pressure to a second friction element associated with said second speed ratio, a method of upshifting the transmission from said first speed ratio to said second speed ratio, comprising the steps of:
   releasing said off-going fluid pressure;
   estimating the torque supplied by said engine upon initiation of said upshift, and supplying on-coming fluid pressure to said second friction element in accordance with a predetermined pressure schedule based on said torque estimation and time;
   detecting the occurrence of an engine speed flare condition during the supply of said on-coming fluid pressure; and
   overriding a normal setting of an engine torque control in response to the detection of said flare condition so as to substantially eliminate the torque supplied by said engine, thereby to eliminate engine flare during said shift due to underestimation of said torque.

2. The method set forth in claim 1, including the step of:
   inhibiting the detection of said engine flare condition if the estimate torque exceeds a threshold amount.

3. In a motor vehicle including a spark ignition internal combustion engine connected to supply torque to a multiple speed ratio transmission and spark control means for establishing a normal timing of said spark ignition, the transmission being upshifted from a first speed ratio to a second speed ratio by releasing an off-going fluid pressure supplied to a first friction element associated with said first speed ratio and supplying on-coming fluid pressure to a second friction element associated with said second speed ratio, a method of upshifting the transmission from said first speed ratio to said second speed ratio, comprising the steps of:

releasing said off-going fluid pressure;

estimating the torque supplied by said engine upon initiation of said upshift, and supplying on-coming fluid pressure to said second friction element in accordance with a predetermined pressure schedule based on said torque estimation and time;

detecting the occurrence of an engine speed flare condition during the supply of said on-coming fluid pressure; and retarding said normal timing of the engine spark ignition in response to the detection of said flare condition so as to substantially eliminate the torque supplied by said engine, thereby to eliminate engine flare during said shift due to underestimation of said torque.

4. The method set forth in claim 3, including the step of:

inhibiting the detection of said engine flare condition if the estimated torque exceeds a threshold amount.

5. In a motor vehicle having an engine connected to supply torque to an input shaft of a multiple speed ratio transmission, the transmission being upshifted from a first speed ratio to a second speed ratio by releasing an off-going fluid pressure supplied to a first friction element associated with said first speed ratio and supplying on-coming fluid pressure to a second friction element associated with said second speed ratio, a method of upshifting the transmission from said first speed ratio to said second speed ratio, comprising the steps of:

releasing said off-going fluid pressure;

estimating the torque supplied by said engine upon initiation of said upshift, and supplying on-coming fluid pressure to said second friction element in accordance with a predetermined pressure schedule based on said torque estimation and time; indicating the occurrence of an engine speed flare condition during the supply of said on-coming fluid pressure if the estimated torque is lower than a threshold value, and the speed of said engine exceeds the speed of said input shaft by at least a reference amount; and overriding a normal setting of an engine torque control in response to said indication of said engine flare condition in an manner to substantially eliminate the torque supplied by said engine, thereby to substantially eliminate engine speed flare during said upshift due to underestimation of the torque supplied by said engine.

* * * * *